INVENTORS.
GUSTAV W. CARLSON
ROBERT C. RUSSELL
Kwis, Hudson & Kent
ATTORNEYS.

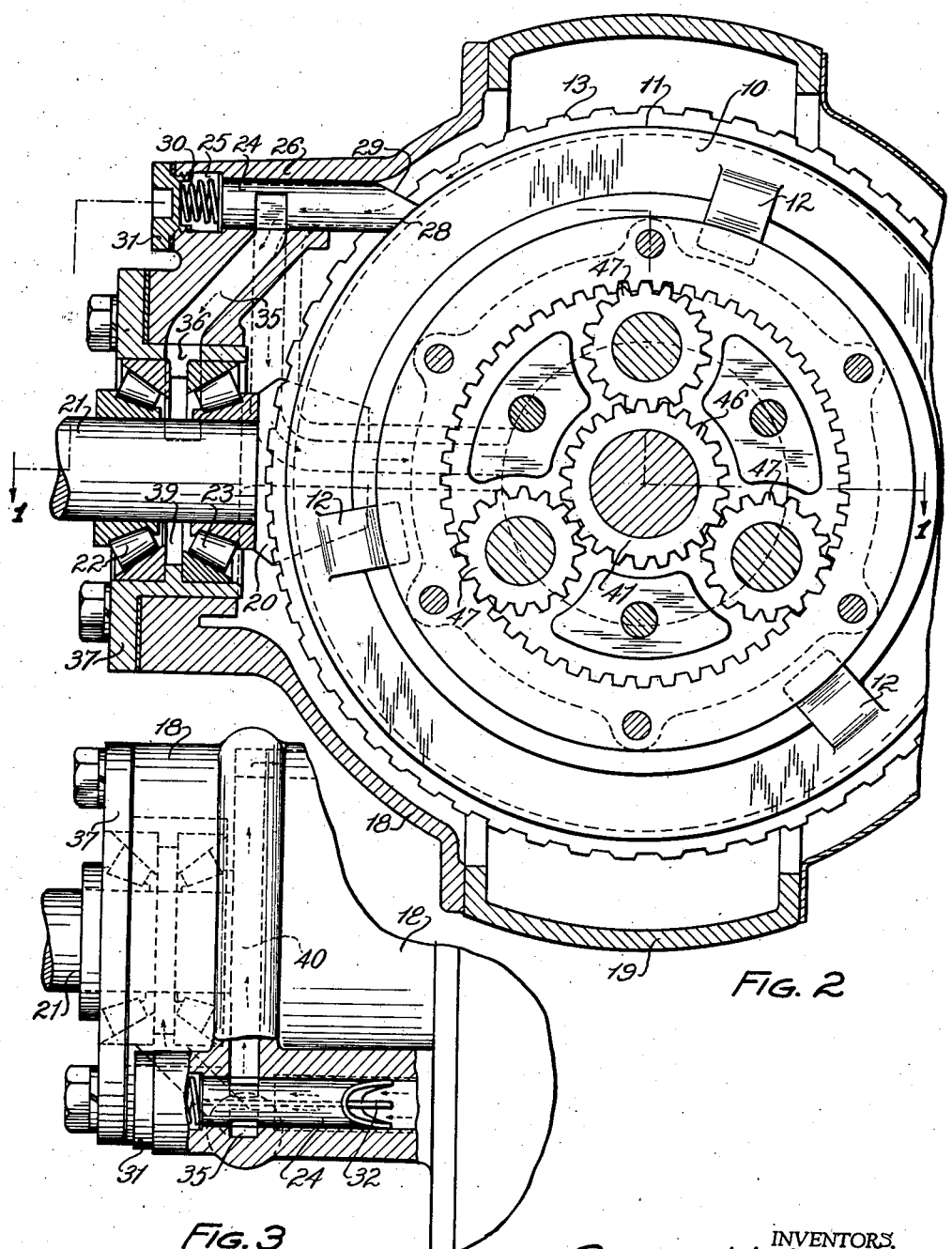

Feb. 14, 1939.　　G. W. CARLSON ET AL　　2,147,145
AUTOMOTIVE DRIVE AXLE
Original Filed Aug. 27, 1936　　3 Sheets-Sheet 3

INVENTORS.
GUSTAV W. CARLSON
BY ROBERT C. RUSSELL
Kwis, Hudson & Kent
ATTORNEYS.

Patented Feb. 14, 1939

2,147,145

UNITED STATES PATENT OFFICE 2,147,145

AUTOMOTIVE DRIVE AXLE

Gustav W. Carlson, Cleveland Heights, and Robert C. Russell, Shaker Heights, Ohio, assignors to Eaton Manufacturing Company, Cleveland, Ohio, a corporation of Ohio Continuation of application Serial No. 98,218, August 27, 1936. This application March 19, 1938, Serial No. 197,021

8 Claims. (Cl. 184—11)

The present invention relates to automotive vehicles and more particularly to drive axles therefor, and this application is a continuation of our earlier filed application, Serial No. 98,218, filed August 27, 1936.

Heretofore in the art numerous devices have been employed to lubricate certain parts of automotive drive axles located above the normal level of the lubricant in the lubricant reservoir formed in the axle housing. These prior art devices rely upon centrifugal force to throw lubricant from a rotating element thereof, such as the ring gear and differential unit assembly, a collector or the like from which collector the lubricant flows to the desired bearings, etc., and at slow speeds, such as encountered in truck operation, there is not sufficient centrifugal force produced to supply adequate lubrication with the result that the axle fails.

An object of the present invention is to provide a novel and improved automotive drive axle comprising means for supplying lubricant to various bearings, gears, and/or other rotating parts of the axle, located above the normal level of the lubricant in the lubricant reservoir of the axle housing at all speeds within the range of the operation of the vehicle.

Another object of the invention is to provide a novel and improved drive axle comprising means for positively supplying lubricant to various bearings, gears, and/or parts thereof located above the normal level of the lubricant in the lubricant reservoir of the axle housing at all speeds within the range of operation of the vehicle, which means does not depend upon centrifugal force for its operation.

Another object of the invention is to provide a novel and improved automotive drive axle of the character referred to which will be simple and rugged in construction, reliable in operation and which can be readily assembled and serviced.

The present invention resides in certain novel details of construction, combinations and arrangements of parts, and further objects and advantages thereof will be apparent to those skilled in the art to which it relates from the following description of the preferred embodiment thereof described with reference to the accompanying drawings, forming a part of this specification, in which similar reference characters designate corresponding parts throughout the several views, and in which:

Fig. 2 is a section approximately on the line 2—2 of Fig. 1.

Fig. 3 is a plan view with portions broken away to show the lubricant collector.

Figure 1:
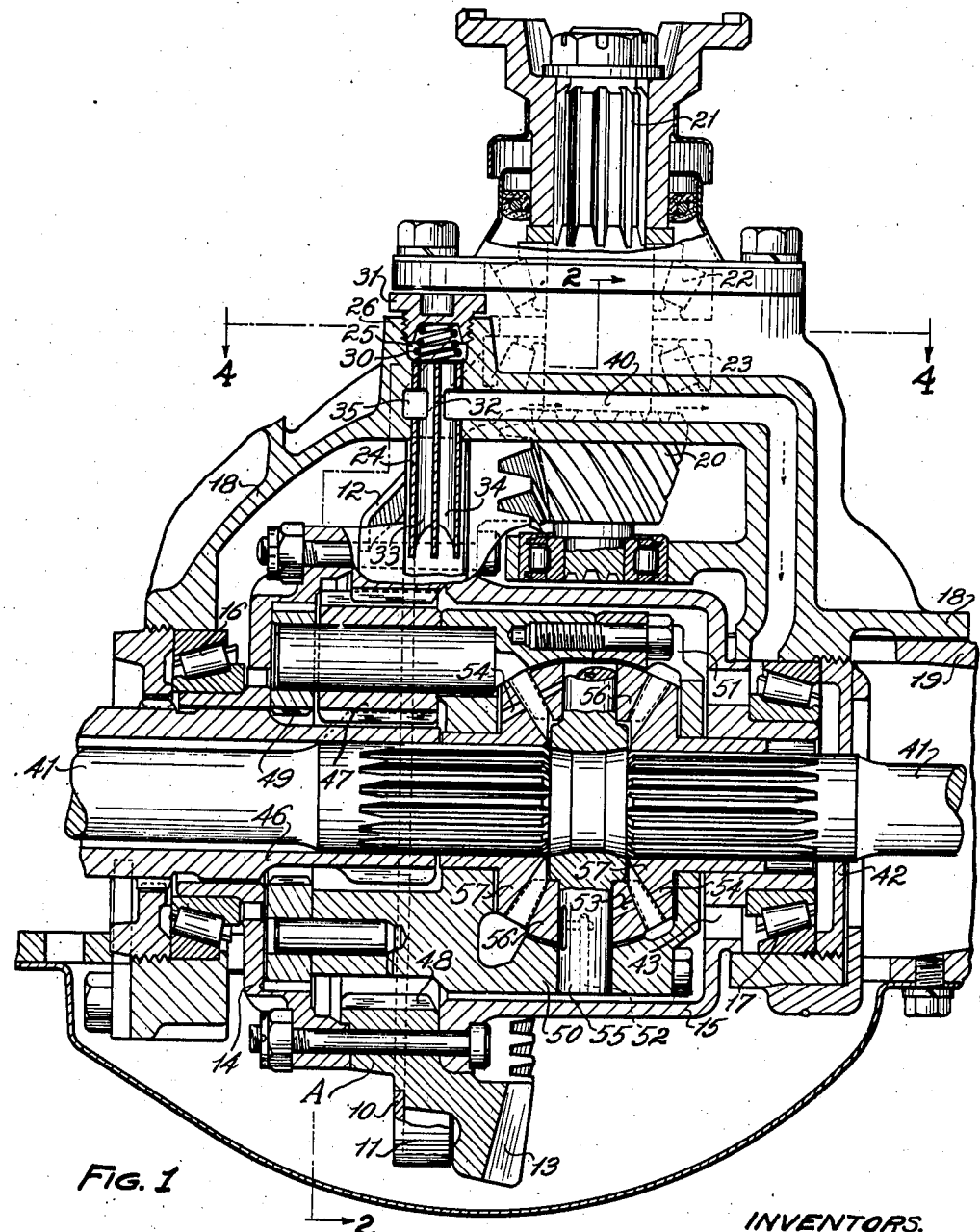
Fig. 1 is a plan section approximately on the line 1—1 of Fig. 2, of a two-speed truck rear axle embodying the present invention.
Figure 4:
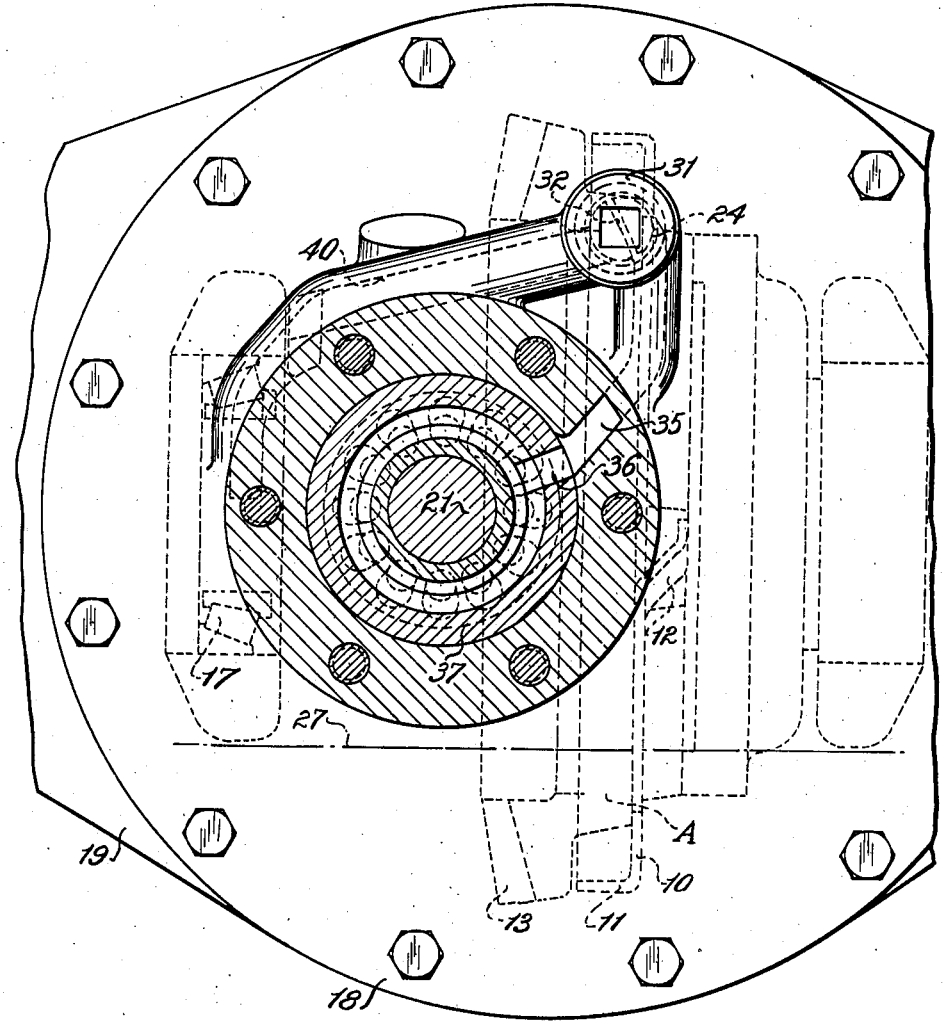
Fig. 4 is a section approximately on the line 4—4 of Fig. 1.
Figure 5:
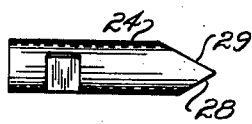
Fig. 5 is a side elevation of the lubricant collector.
Figure 6:
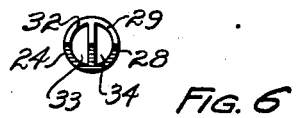
Fig. 6 is an end elevation of the lubricant collector shown in Fig. 5, looking towards the left.

The present invention is particularly applicable to automotive truck axles, which under some conditions of operation, especially when traveling through mountainous or hilly country, are run under heavy loads for long periods of time at comparatively slow speeds.

The invention as herein shown and described is embodied in a two-speed step-down truck axle because the question of lubrication is of particular importance in axles of this character, since these axles permit operation of the vehicle equipped therewith at abnormally slow speeds and under extreme load conditions, and because the speed reducing mechanism is operated only when the vehicle is being operated at its lowest speeds.

The automotive axle shown in the drawings is a well known commercial axle modified to embody the present invention and operates in a manner similar to that shown and described in U. S. Patent No. 1,623,212, and only those parts of the axle which are necessary to the complete understanding of the present invention are herein referred to and described in detail.

According to the provisions of the present invention lubricant is scraped from the ring gear or some other suitable part of the ring gear assembly by a scraper or member yieldably forced into engagement therewith, thus insuring a constant supply of lubrication at all times irrespective of how slowly the vehicle may be operated. As shown, the scraper member is slidably supported in an aperture formed in the differential carrier and lubricant is conducted from the scraper member to the desired point through the medium of conduits formed in the walls of the differential carrier. The scraper member is also accessible from the outside which facilitates assembly, maintenance, etc. Since all of the various elements are carried by the differential carrier a simple, compact and rugged construction is provided which is extremely reliable in operation. The fact that the ring gear assembly, or the part against which the scraper engages, is ahead of the last speed reduction and therefore rotates at a higher speed than the axle shafts when the drive is through the speed reduction is advantageous, since this increases the R. P. M. of the part engaged by the scraper over that of the axle shafts which are barely moving when the vehicle is being operated at abnormally slow speeds. The aforesaid construction assures adequate lubrication under conditions where the lubricant is most needed. Similar conditions are not encountered in the operation of so-called "overdrive" or two-speed step-up axles employed in certain commercial passenger cars in which the speed change gears are operated only during the higher speeds, that is, at speeds at which conventional lubrication systems depending upon centrifugal force for their operation supply adequate lubrication.

Referring to the drawings, the reference character 10 designates a cup-like member including a peripheral flange 11, fixed to the ring gear and differential unit assembly designated generally by the reference character A, by a plurality of fingers 12 formed integral with the member 10 and extending into slots cut in the hub of the ring gear 13. The fingers 12 are clamped within the slots in the hub of the ring gear 13 by the left-hand support case 14 of the assembly A which assembly also includes a right-hand support case 15. The ring gear assembly is rotatably supported by anti-friction bearings 16 and 17 in a carrier 18 detachably secured to the rear axle housing 19. The assembly A is adapted to be driven by a pinion 20 fixed to a shaft 21 rotatably supported in the ring gear and differential carrier 18 by roller bearings 22 and 23.

The outer surface of the cylindrical flange 11 of the member 10 is continuously engaged by a substantially tubular lubricant collector or scraper 24 slidably supported in a cylindrical aperture 25 in a boss 26 formed integrally with the upper part of the carrier 18. The scraper or collector member 24 is positioned above the level of the bearings, etc., which it is desired to lubricate which in turn are above the normal level of the lubricant in the lubricant reservoir of the axle housing. As the assembly A rotates during operation of the axle, the scraper 24 collects or scrapes lubricant from the flange 11 of the member 10, the lower part of which extends below the normal level of the lubricant 27 in the rear axle housing. The under part 28 of the inwardly projecting or rear end of the scraper 24 is made to conform to the periphery of the flange 11 and the upper side 29 thereof is cut away so that the lubricant can readily flow into the interior of the collector scraper. The rear end of the collector or scraper 24 is urged into continuous contact with the flange 11 by a coil spring 30 interposed between the front end of the scraper and a plug 31 threaded into the counterbored forward end of the aperture 25. The spring 30 provides a substantially constant pressure between the member 10 and the scraper 24 and allows the scraper to readily follow the periphery of the member which may not run exactly true. The aforesaid construction also minimizes the amount of noise incident to the scraper rubbing against the member 10 and assists in dampening whatever noise is produced.

In the present instance the scraper has a partition 32 formed therein dividing the same into two chambers or compartments 33 and 34, each of which communicates with separate conduits or passages in the carrier housing. The left-hand chamber 33, as viewed in Fig. 1, has a conduit or passage 35 communicating therewith, the lower end of which opens through a passage or port 36 in the member 37, into the chamber 39 which houses the bearings 22 and 23 for the pinion shaft 21. A separate conduit or passage 40 communicates with the right-hand chamber 34 of the collector 24 and the right-hand bearing 17 for the assembly A. The construction is such that lubricant collecting on the scraper 24 will flow through the passageways or conduits 35 and 36 to the pinion shaft bearings 22 and 23, and the right-hand bearing 17, respectively, for the assembly A. The lubricant entering the bearing 17 is prevented from flowing to the right along the drive axle 41 and the rear axle housing 19 by a bearing adjuster 42 which has only a small clearance between it and the drive axle.

From the bearing 17 the lubricant flows into the interior of the enclosure formed by the support cases 14 and 15, and the ring gear 13 of the assembly A through holes 43 formed in the right-hand support case 15, where it lubricates the differential assembly, and the speed reducing mechanism comprising the sliding sun gear 46, planet gears 47, orbit gear 48, gears 49, and the necessary shift fork, etc., not shown. Lubricant enters the differential case 50 through a plurality of openings 51 and the flow of lubricant to the various gears, bearings, etc., of the differential is facilitated by a plurality of oil passages or ports 52, 53, and 54 in the pinion shafts 55 and the gears 56 and 57, respectively. Eventually some of the lubricant returns to the rear axle housing along the sliding sun gear 46 and through the left-hand bearing 16.

The partition 32 in the scraper 24 may be located slightly to one side of the center, thus diverting a larger portion of lubricant into one conduit or the other, or it may be omitted altogether as will be apparent to those skilled in the art. It will also be seen that two or more partitions may be employed, thus dividing the scraper into a corresponding number of chambers, all of which may be connected to various parts of the axle. While in the present instance a separate member 10 has been included in the ring gear and differential unit assembly A for the collector or scraper to engage, it will be understood that under some circumstances it may be desirable, or even preferable, to have the collector or scraper directly engage the ring gear or some other suitable part of the assembly A.

From the foregoing description of the preferred embodiment of the invention, it will be apparent that the objects of the invention heretofore enumerated have been attained and that a novel and improved axle has been provided comprising means for positively supplying lubricant to various bearings, differential gears, speed change gears, etc., thereof at all speeds within the range of operation of the vehicle. While the preferred embodiment of the invention has been described in considerable detail, we do not wish to be limited to the particular construction shown, which may be varied within the scope of this invention. It is our intention to hereby cover all adaptations, modifications, and uses thereof that come within the practice of those skilled in the art to which the invention relates, and we particularly point out and claim as our invention, the following:

1. In an automotive drive axle the combination of an axle housing having a lubricant reservoir in the lower portion thereof, a ring gear and differential assembly having a continuous annular surface thereon, a bearing located above the normal level of the lubricant in said lubricant reservoir for rotatably supporting said assembly within said axle housing with the lower portion of said annular surface extending below the normal level of the lubricant in the lubricant reservoir in the axle housing, a pinion in mesh with the ring gear of said assembly for rotating the same, a bearing located above the normal level of the lubricant in said reservoir in the axle housing for rotatably supporting said pinion in said housing, a lubricant scraper carried by said housing and yieldably urged into continuous engagement with said annular surface of said assembly for scraping lubricant therefrom as said assembly rotates in operation, and means for conducting lubricant from said scraper to one of said bearings.

2. In an automotive drive axle the combination of an axle housing having a lubricant reservoir in the lower portion thereof, a ring gear and differential assembly having a continuous annular surface thereon, a bearing located above the normal level of the lubricant in said lubricant reservoir for rotatably supporting said assembly within said axle housing with the lower portion of said annular surface extending below the normal level of the lubricant in said lubricant reservoir in the axle housing, a pinion in mesh with the ring gear of said assembly for rotating the same, a bearing located above the normal level of the lubricant in said reservoir in the axle housing for rotatably supporting said pinion in said housing, said axle housing having an aperture therein, a lubricant scraper slidably supported in said aperture and yieldably urged into continuous engagement with said annular surface of said assembly for scraping lubricant therefrom as said assembly rotates in operation, and means for conducting lubricant from said scraper to one of said bearings.

3. In an automotive drive axle the combination of an axle housing having a lubricant reservoir in the lower portion thereof, a differential carrier housing detachably connected to said axle housing, a ring gear and differential assembly having a continuous annular surface thereon, a bearing located above the normal level of the lubricant in said lubricant reservoir for rotatably supporting said assembly within said differential carrier housing with the lower portion of said annular surface extending below the normal level of the lubricant in the lubricant reservoir, a pinion in mesh with the ring gear of said assembly for rotating the same, a bearing located above the normal level of the lubricant in said reservoir for rotatably supporting said pinion in said differential carrier housing, a lubricant scraper carried by said differential carrier housing and yieldably urged into continuous engagement with said annular surface of said assembly for scraping lubricant therefrom as said assembly rotates in operation, and means including a conduit formed in said differential carrier housing for conducting lubricant from said scraper to one of said bearings.

4. In an automotive drive axle the combination of an axle housing, a differential carrier housing detachably carried by said axle housing and forming therewith a lubricant reservoir in the lower portion thereof, a ring gear and differential assembly having a continuous annular surface thereon, a bearing located above the normal level of the lubricant in said lubricant reservoir for rotatably supporting said assembly in said differential carrier housing with the lower portion of said annular surface extending below the normal level of the lubricant in said lubricant reservoir, a pinion in mesh with the ring gear of said assembly for rotating the same, a bearing located above the normal level of the lubricant in said reservoir for rotatably supporting said pinion in said differential carrier housing, said differential carrier housing having an aperture therein, a lubricant scraper slidably supported in said aperture, resilient means located in said aperture for yieldably urging said scraper into continuous engagement with said annular surface of said assembly for scraping lubricant therefrom as said assembly rotates in operation, and means including a conduit formed in said differential carrier housing for conducting lubricant from said scraper to one of said bearings.

5. In an automotive drive axle the combination of an axle housing, a differential carrier housing detachably connected to said axle housing and forming therewith a lubricant reservoir in the lower portion thereof, a ring gear and differential assembly having a continuous annular surface thereon, a bearing located above the normal level of the lubricant in said lubricant reservoir for rotatably supporting said assembly in said differential carrier housing with the lower portion of said annular surface extending below the normal level of the lubricant in said lubricant reservoir, a pinion in mesh with the ring gear of said assembly for rotating the same, a bearing located above the normal level of the lubricant in said reservoir for rotatably supporting said pinion in said differential carrier housing, said differential carrier housing having an aperture therein located above said bearings and extending through said differential carrier housing, means for closing the outer end of said aperture, a lubricant scraper slidably supported in said aperture and insertable therein from the exterior of said housing, resilient means in said aperture behind said scraper for yieldably urging said scraper into continuous engagement with said annular surface of said assembly for scraping lubricant therefrom as said assembly rotates in operation, and means including a conduit formed in said differential carrier housing for conducting lubricant from said scraper to one of said bearings.

6. In an automotive drive axle the combination of an axle housing having a lubricant reservoir in the lower portion thereof, a ring gear and differential assembly having a continuous annular surface thereon, said assembly including a support case and speed reducing gearing within the latter, a bearing located above the normal level of the lubricant in the lubricant reservoir of said axle housing for rotatably supporting said assembly within said housing with the lower portion of said annular surface extending below the normal level of the lubricant in said lubricant reservoir in said axle housing, a pinion in mesh with the ring gear of said assembly for rotating the same, said axle housing having an aperture therein above the level of the axis of said bearing, a lubricant scraper slidably supported in said aperture and yieldably urged into continuous engagement with said annular surface of said assembly for scraping lubricant therefrom as said assembly rotates in operation, means for conducting lubricant from said scraper to said bearing, and means for conducting lubricant from said bearing to the interior of said assembly.

7. In an automotive drive axle the combination of an axle housing having a lubricant reservoir in the lower portion thereof, a differential carrier housing detachably connected to said axle housing, a ring gear and differential assembly having a continuous annular surface thereon, said assembly including a support case and speed reducing gearing within the latter, a bearing located above the normal level of the lubricant in the lubricant reservoir of said axle housing for rotatably supporting said assembly within said differential carrier housing with the lower portion of said annular surface extending below the normal level of the lubricant in said lubricant reservoir, a pinion in mesh with the ring gear of said assembly for rotating the same, said axle housing having an aperture extending therethrough, detachable means for closing the outer end of said aperture, a lubricant scraper slidably supported in said aperture and insertable therein from the outside of said axle housing, resilient means in said aperture behind said scraper for yieldably urging said scraper into continuous engagement with said annular surface of said assembly for scraping lubricant therefrom as said assembly rotates in operation, means including a conduit formed in said differential carrier housing for conducting lubricant from said scraper to said bearing, and means for conducting lubricant from said bearing to the interior of said assembly.

8. In an automotive drive axle the combination of an axle housing, a differential carrier housing detachably connected to said axle housing and forming therewith a lubricant reservoir in the lower portion thereof, a ring gear and differential assembly having a continuous annular surface thereon, said assembly including a support case and speed reducing gearing within the latter, a bearing located above the normal level of the lubricant in said lubricant reservoir for rotatably supporting said assembly in said differential carrier housing with the lower portion of said annular surface below the normal level of the lubricant in said lubricant reservoir, a pinion in mesh with the ring gear of said assembly for rotating said assembly, a bearing located above the normal level of the lubricant in said lubricant reservoir for rotatably supporting said pinion in said differential carrier housing, said differential carrier housing having an aperture therein located above the bottom of said bearings, detachable means for closing the outer end of said aperture, a lubricant scraper slidably supported in said aperture and insertable therein from the outside of said housing, resilient means in said aperture behind said scraper for yieldably urging said scraper into continuous engagement with said annular surface of said assembly for scraping lubricant therefrom as said assembly rotates in operation, means including conduits formed in said differential carrier housing for conducting lubricant from said scraper to said bearings, and means for conducting lubricant from one of said bearings to the interior of said assembly.

GUSTAV W. CARLSON.
ROBERT C. RUSSELL.